(12) United States Patent
Ueda (10) Patent No.: US 10,907,733 B2
(45) Date of Patent: Feb. 2, 2021

(54) METHOD FOR PRODUCING TANK WITH PROTECTIVE MEMBER

(71) Applicant: TOYOTA JIDOSHA KABUSHIKI KAISHA, Toyota (JP)

(72) Inventor: Naoki Ueda, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 282 days.

(21) Appl. No.: 15/862,900

(22) Filed: Jan. 5, 2018

(65) Prior Publication Data
US 2018/0202553 A1 Jul. 19, 2018

(30) Foreign Application Priority Data
Jan. 16, 2017 (JP) ................................ 2017-005416

(51) Int. Cl.
*F16J 12/00* (2006.01)
*F17C 1/06* (2006.01)
(Continued)

(52) U.S. Cl.
CPC .............. *F16J 12/00* (2013.01); *B29C 70/086* (2013.01); *B29C 70/222* (2013.01); *B29C 70/32* (2013.01);
(Continued)

(58) Field of Classification Search
CPC . F16J 12/00; F16J 1/06; B29C 70/086; B29C 70/222; B29C 70/32; B29C 70/545
(Continued)

(56) References Cited

U.S. PATENT DOCUMENTS 2,848,133 A * 8/1958 Ramberg .............. B29C 53/602
220/590
3,231,442 A * 1/1966 Michael .................... F16L 9/16
156/155
(Continued)

FOREIGN PATENT DOCUMENTS

JP 06024450 A * 2/1994 ............ B65D 23/14
JP 09203497 A * 8/1997
(Continued)

*Primary Examiner* — J. Gregory Pickett
*Assistant Examiner* — Niki M Eloshway
(74) *Attorney, Agent, or Firm* — Finnegan, Henderson, Farabow, Garrett & Dunner, LLP (57) ABSTRACT

Provided are a method for producing a tank with an outer surface profile that allows an elastic protective member to be easily and firmly attached to a surface thereof, and also such a tank with a protective member. The method for producing the tank, which includes winding fiber bundles containing an uncured resin component in multiple layers around the outer surface of a liner in a first pitch width so as to form a fiber reinforced resin layer and securely bonding the protective member to a portion of the outer surface thereof, further includes: winding the fiber bundles in a second pitch width wider than the first pitch width so as to form a gap with a required width where no fiber bundle is present between adjacent fiber bundles in winding the fiber bundles to form an outermost fiber bundle layer; shaving off a tip end portion of a projection made of a resin that has cured after bleeding into the gap, with a portion thereof left unshaved so as to form a sharpened portion; and securely bonding the protective member to the sharpened portion while pressing it from above.

2 Claims, 7 Drawing Sheets (51) Int. Cl.
*B29C 70/22* (2006.01)
*B29C 70/08* (2006.01)
*B32B 5/24* (2006.01)
*B29C 70/32* (2006.01)
*B29C 70/54* (2006.01)
*B29L 22/00* (2006.01)
*B29K 101/10* (2006.01)
*B29K 105/08* (2006.01)

(52) U.S. Cl.
CPC .............. *B29C 70/545* (2013.01); *B32B 5/24* (2013.01); *F17C 1/06* (2013.01); *B29K 2101/10* (2013.01); *B29K 2105/08* (2013.01); *B29L 2022/00* (2013.01); *F17C 2201/0109* (2013.01); *F17C 2201/056* (2013.01); *F17C 2203/0604* (2013.01); *F17C 2203/0612* (2013.01); *F17C 2203/0619* (2013.01); *F17C 2203/0663* (2013.01); *F17C 2205/0196* (2013.01); *F17C 2223/0123* (2013.01); *F17C 2223/036* (2013.01); *F17C 2270/0168* (2013.01)

(58) Field of Classification Search
USPC ....................................................... 220/590
See application file for complete search history.

(56) References Cited

U.S. PATENT DOCUMENTS

| | | | | |
|---|---|---|---|---|
| 3,715,252 A * | 2/1973 | Fairbairn | ............... | B29C 53/582 156/162 |
| 4,174,243 A * | 11/1979 | Magarian | ................ | B29C 53/60 118/106 |
| 4,460,422 A * | 7/1984 | Michael | .................. | B29C 53/66 118/107 |
| 2010/0276434 A1* | 11/2010 | Berger | ...................... | F17C 1/06 220/586 |
| 2011/0204063 A1* | 8/2011 | Breuer | .............. | H01M 8/04208 220/590 |
| 2014/0131365 A1* | 5/2014 | Miyoshi | ................ | B29C 70/086 220/590 |
| 2018/0290537 A1* | 10/2018 | Ueda | ..................... | F17C 13/003 |

FOREIGN PATENT DOCUMENTS

| | | | |
|---|---|---|---|
| JP | 2011-144860 | 7/2011 | |
| JP | 2014-190495 | 10/2014 | |
| WO | WO-2010116529 A1 * | 10/2010 | ................ F17C 1/16 |

* cited by examiner

METHOD FOR PRODUCING TANK WITH PROTECTIVE MEMBER

CROSS REFERENCE TO RELATED APPLICATIONS

The present application claims priority from Japanese patent application JP 2017-005416 filed on Jan. 16, 2017, the content of which is hereby incorporated by reference into this application.

BACKGROUND

Technical Field

The present disclosure relates to a method for producing a tank with a protective member, in particular, a tank that is shaped such that the outer surface of a liner thereof is covered with a fiber reinforced resin layer and that has an elastic protective member in a portion of the outer surface, and relates to the tank with a protective member.

Background Art

As a method for producing a high-pressure tank used for storage or supply of hydrogen or the like, there is known a method that includes winding fiber bundles containing an uncured resin component, such as CFRP, around the outer peripheral surface of a liner in a predetermined pitch width, and then curing the resin so as to form a fiber reinforced resin layer. JP 2014-190495 A describes a high-pressure tank produced in such a manner, with an elastic protective member securely bonded to a dome portion thereof using an adhesive.

Further, JP 2011-144860 A describes a method for producing a high-pressure tank with a protective member that has a step of winding fiber bundles containing an uncured resin component around the outer surface of a resin liner in a predetermined pitch width so as to form an uncured fiber reinforced resin layer, the method including a step of applying a solvent to an uncured surface resin layer, which has been formed through bleeding of the uncured resin component of the uncured fiber reinforced resin layer to the outside, to allow the solvent to infiltrate the uncured surface resin layer, and a step of performing heating treatment for foaming the surface resin layer to make it porous through removal of the solvent by evaporation as well as curing the resin component of the uncured fiber reinforced resin layer.

SUMMARY

Figure 7:
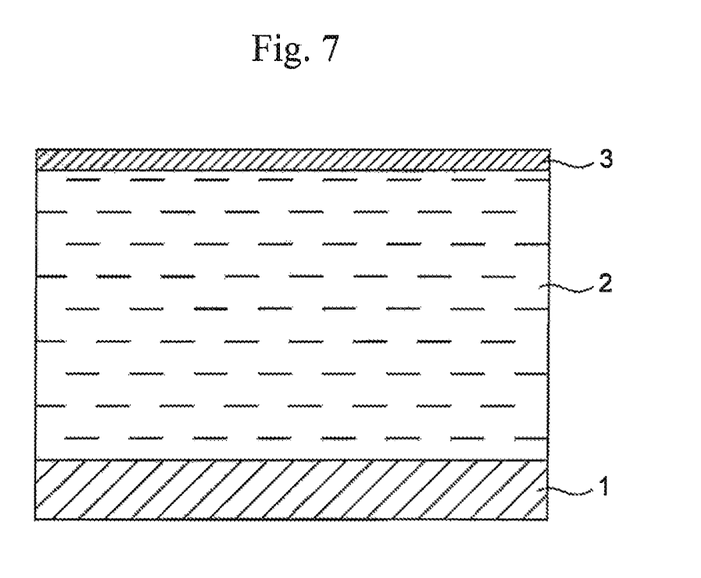
FIG. 7 is a partial view for illustration of the structure of a conventional high-pressure tank with a protective member.

FIG. 7 is a schematic partial view of a high-pressure tank produced using the method for producing a high-pressure tank described in JP 2014-190495 A or JP 2011-144860 A, the method including winding fiber bundles containing an uncured resin component around the outer surface of a liner in a predetermined pitch width so as to form an uncured fiber reinforced resin layer. In FIG. 7, reference numeral 1 indicates a liner and the outer surface of the liner 1 has formed thereon a fiber reinforced resin layer 2 of the fiber bundles wound therearound. Further, the outer surface of the fiber reinforced resin layer 2 has formed thereon a surface resin layer 3. The surface resin layer 3 is a layer solely made of an excess resin that has bled to the outside in forming the fiber reinforced resin layer 2 through winding of the fiber bundles impregnated with the uncured resin around the liner 1.

In the actual high-pressure tank produced in the aforementioned manner, the surface of the surface resin layer 3 is not flat. This is because the surface obtained after the bleeding resin is cured is a rough surface with many projections in different sizes irregularly present thereon, because the resin bleeds from the fiber bundles randomly and irregularly both in the amount and site.

As described in JP 2014-190495 A, in a high-pressure tank, typically, an elastic protective member made of a foamed resin molded product, a rubber molded product of synthetic rubber, such as urethane and silicone, or the like is securely bonded to a dome portion of the tank using an adhesive to protect the main body of the tank form shock applied to the dome portion. In that case, if the protective member is attached to a rough surface, the state of the attached protective member is unstable. Therefore, in attaching the protective member to the surface, it is necessary to shave off tip end portions of the aforementioned projections to obtain a substantially flat surface.

Further, the surface resin layer 3 is, in most cases, a transparent resin layer and thus has high light transmission. Therefore, it is difficult to accurately identify the shape of the rough surface and the positions of projections on the surface using laser or the like, and the actual operation of shaving off the tip end portions is manually performed while the shape is visually and tactually checked. The work load of such operation is significant in producing the aforementioned high-pressure tank with a protective member. Furthermore, at the time of secure bonding of the protective member, it is also necessary to apply an adhesive to the surface obtained through shaving off the tip end portions or the backside of the protective member and to temporarily press the protective member until the adhesive is cured.

The present disclosure has been made in view of the foregoing circumstances, and provides a method for producing a tank with a protective member, the method including winding fiber bundles containing an uncured resin component in multiple layers around the outer surface of a liner in a first pitch width so as to form an uncured fiber reinforced resin layer, which can facilitate and quickly perform the operation of secure bonding of the protective member, and also provides such a tank with a protective member.

The method for producing a tank with a protective member according to the present disclosure is a method that basically includes at least winding fiber bundles containing an uncured resin component in multiple layers around the outer surface of a liner in a first pitch width so as to form a fiber reinforced resin layer, the method including: forming one or more regions where fiber bundles are wound in a second pitch width wider than the first pitch width so as to form a gap with a required width where no fiber bundle is present between adjacent fiber bundles in winding the fiber bundles to form at least an outermost layer; shaving off a tip end portion of a projection made of a resin that has cured after bleeding into the gap, with a portion of the projection in a predetermined height left unshaved; and securely bonding an elastic protective member to the portion left unshaved as a base.

According to the method for producing a tank with a protective member, secure bonding of the protective member to the outer surface of the tank produced is easily performed and the state of the securely bonded protective member is stable.

In the method for producing a tank with a protective member, in a preferred embodiment, the tip end portion is shaved off so as to form a sharpened portion at the tip end of the portion of the projection left unshaved. Further, in another preferred embodiment, the method for producing a tank with a protective member further includes forming a light reflecting layer through application of a material for forming the light reflecting layer on at least a surface of the projection and determining the position and shape of the projection through irradiating the light reflecting layer with laser, in which the tip end portion is shaved off based on the information obtained from the determination.

Further, in the method for producing a tank with a protective member, in a preferred embodiment, an adhesive or a material containing a base material for bonding is used as the material for forming the light reflecting layer. Furthermore, in the method for producing a high-pressure tank with a protective member, in another preferred embodiment, the one or more regions where the fiber bundles are wound in the second pitch width is/are present in at least a dome portion of the tank.

The high-pressure tank with a protective member according to the present disclosure is a tank with an elastic protective member that has a fiber reinforced resin layer formed through winding fiber bundles containing an uncured resin component in multiple layers around the outer surface of a liner, in which at least the outermost layer of the fiber reinforced resin layer has one or more regions where a gap with a required width where no fiber bundle is present between the fiber bundles is formed, the resin that has cured after bleeding from the fiber bundles is present in the gap, the tip end portion of the resin cured is a sharpened portion, and the elastic protective member is securely bonded to the sharpened portion such that the sharpened portion is thrust into the backside thereof.

In a preferred embodiment of the tank with a protective member, the one or more regions where the gap is formed is/are positioned in at least a dome portion of the tank.

According to the present disclosure, it is possible to obtain a tank that has a fiber reinforced resin layer on the outer surface of a liner thereof and that further includes an elastic protective member on the outer surface of the fiber reinforced resin layer, in which the protective member is easily and surely bonded securely to a required portion on the outer surface of the liner.

DETAILED DESCRIPTION

An embodiment of the present disclosure will be described below with reference to the drawings.

Figure 1:
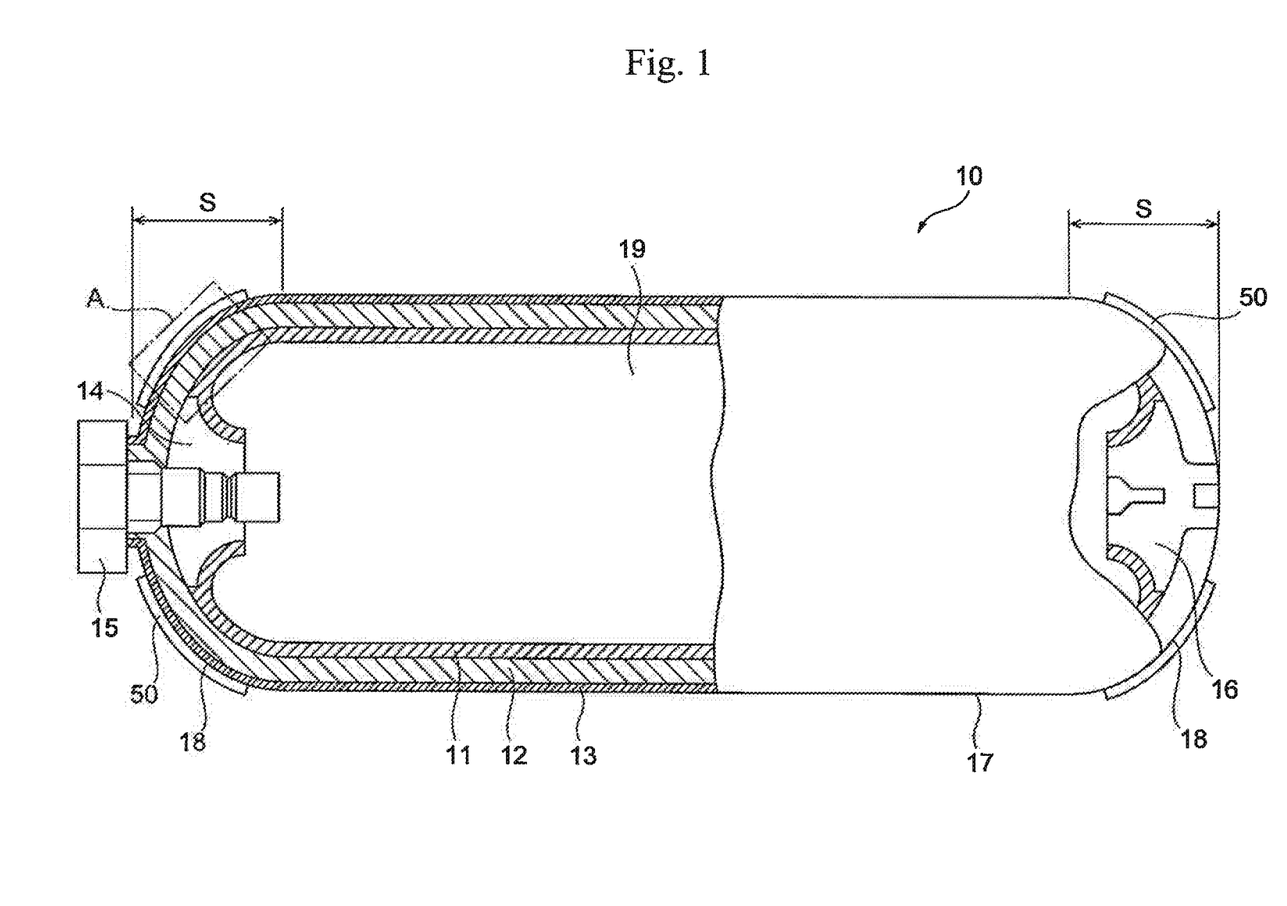
FIG. 1 is a view of an example of a high-pressure tank with a protective member.

FIG. 1 is a schematic view of an example of a tank with a protective member. In this example, a tank 10 is a high-pressure tank with a protective member and is adapted to be filled with a high-pressure hydrogen gas and mounted on a fuel cell vehicle. However, the high-pressure tank 10 with a protective member may be used for any purposes, and the filling is not limited to a high-pressure hydrogen gas.

In this example, a cylindrical body 17 in the center portion and dome portions 18 in a round dome shape in regions S on opposite end sides of the cylindrical body 17 form the shape of the high-pressure tank 10 with a protective member, and the high-pressure tank 10 includes a gas barrier liner 11 and a fiber reinforced resin layer 12 including a surface resin layer 13. Further, the high-pressure tank 10 has openings formed at the opposite ends thereof, and one of the openings has attached thereto a mouthpiece 14 with a valve 15, and the other has attached thereto an end boss 16. The cylindrical body 17 forms the center portion of the tank 10.

The liner 11 is a resin member that defines an accommodation space 19 to be filled with, for example, a high-pressure hydrogen gas. Typically, the liner 11 is made of a thermoplastic resin that can be processed into a substantially cylindrical shape or the like. The resin that forms the liner 11 is preferably a resin that can be easily processed and has a property of retaining a hydrogen gas within the accommodation space 19, that is, a resin that is excellent in the gas barrier property. Examples of such a resin include a thermoplastic resin, such as polyester, polyamide, polyethylene, and ethylene vinyl alcohol copolymer (EVOH).

The liner 11 is in a substantially cylindrical shape with the dome portions 18 at the opposite ends of the cylindrical body 17 as described above. Each of the dome portions 18 of the liner 11 has an opening formed therein as described above, and the openings in the dome portions 18 at the opposite ends are provided with the mouthpiece 14 and the end boss 16, respectively. The fiber reinforced resin layer 12 is formed along the outer surface of the liner 11, and an elastic protective member 50 (see also FIG. 6) is securely bonded to each of the dome portions 18.

The fiber reinforced resin layer 12 is a layer that covers the outer surface of the liner 11 and has a function of reinforcing the liner 11 to improve the mechanical strength of the high-pressure tank 10, such as the rigidity and pressure resistance. The fiber reinforced resin layer 12 includes a thermosetting resin and reinforcement fiber bundles. As the thermosetting resin, it is preferable to use a phenol resin, melamine resin, urea resin, epoxy resin, and the like, of which the epoxy resin, in particular, is preferably used from the viewpoint of the mechanical strength and the like. As the reinforcement fibers, glass fibers, aramid fibers, boron fibers, carbon fibers, and the like can be used, and the carbon fibers, in particular, are preferably used from the viewpoint of the lightness, mechanical strength, and the like.

Typically, an epoxy resin is obtained through mixing and thermally curing a prepolymer, such as a copolymer of bisphenol A and epichlorohydrin, and a curing agent, such as polyamine. The epoxy resin is fluid in an uncured state, but after thermally cured, the epoxy resin forms a strong cross-linked structure so as to become insoluble in a solvent, such as methyl ethyl ketone (MEK).

The fiber reinforced resin layer 12 is formed such that bundles of fibers (for example, carbon fibers) impregnated with an uncured resin (for example, an epoxy resin) are wound around the outer surface of the liner 11 in multiple layers in a given pitch width (hereinafter referred to as a first pitch width a), and the resin is then cured. For example, a shaft is attached to the mouthpiece 14 and end boss 16 of the liner 11 and rotatably supported, and fiber bundles impregnated with resin are wound while the shaft is being rotated. Then, heating is performed at the curing temperature of the resin to cure the resin component. Helical winding or hoop winding is adopted for winding of the fiber bundles. The first pitch width a is typically set to a value almost equal to the width of each of the fiber bundles to be used.

Figure 2:
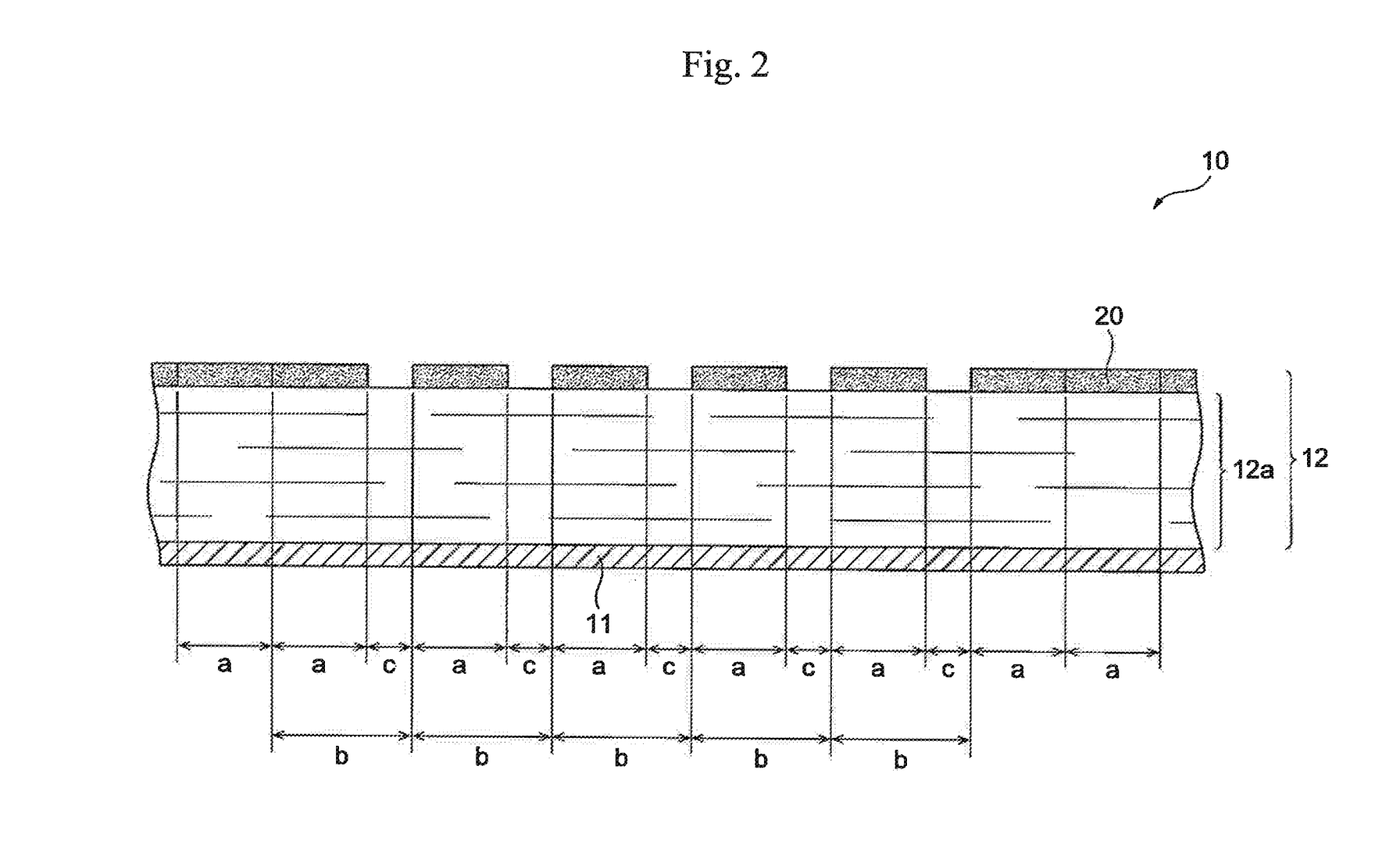
FIG. 2 is a first view for illustration of an operation procedure of an embodiment.

In winding the fiber bundles impregnated with resin in multiple layers, as shown in FIG. 2, when the fiber bundles are wound to form at least an outermost layer 20 of the fiber reinforced resin layer 12, the fiber bundles are wound around some regions in a second pitch width b wider than the first pitch width a. The region where the fiber bundles are wound in the second pitch width b may be any region, but is preferably a region of each of the dome portions 18 of the high-pressure tank 10.

FIG. 2 to FIG. 6 are schematic enlarged views of a region indicated by A in FIG. 1 of the high-pressure tank 10 with a protective member of the present embodiment. It should be noted that the region A is a portion of the dome portion 18, and thus actually has a curved surface, but in FIG. 2 to FIG. 6, the region A is shown as a plane for easy understanding. In this example, a portion 12a other than the uppermost layer 20 of the fiber reinforced resin layer 12 is entirely wound with the fiber bundles impregnated with an uncured resin in multiple layers in the first pitch width a, for example. Herein, the first pitch width a is almost equal to the width of each of the fiber bundles and no gap is present between the fiber bundles.

In winding the fiber bundles to form the uppermost fiber bundle layer 20, the fiber bundles impregnated with resin are wound in the second pitch width b wider than the first pitch width a in a region where the protective member is to be securely bonded after completion of the high-pressure tank, which is, in this example, an appropriate portion of the dome portion 18 of the tank. In an example shown in FIG. 2, the second pitch width b is "the first pitch width a plus the width c of the gap." As an example, the first pitch width a and the second pitch width b are typically around 12 to 20 mm and around 20 to 24 mm, respectively.

Through winding the fiber bundles to form the uppermost fiber bundle layer 20 in the aforementioned manner, in the uppermost layer, a portion where the fiber bundles are wound in the first pitch width a has the fiber bundles arranged in rows substantially with no gap therebetween, while in a region where the fiber bundles are wound in the second pitch width b, as shown in FIG. 2, a gap with the width c with no fiber bundle present therein is formed between adjacent fiber bundles. In the experiment conducted by the present inventors, an intended purpose was able to be achieved when the width c of the gap was set to around 0.25 to 0.5 times the width of the fiber bundle as 1.

It should be noted that in the example shown in the drawings, winding of the fiber bundles in the second pitch width b is performed only in the uppermost fiber bundle layer 20, but also in some of the layers below the uppermost layer, the fiber bundles may be wound in the second pitch width b in some portions. However, in that case, the layers are preferably formed through winding the fiber bundles so that the gaps with the width c where no fiber bundle is present in the layers are radially aligned relative to the central axis of the tank.

In the fiber reinforced resin layer 12 that is formed through winding the fiber bundles impregnated with an uncured resin (for example, an epoxy resin) in multiple layers, the surface resin layer 13 is formed through bleeding of the uncured resin to the outside as shown in FIG. 1. As described above, typically, the surface of the surface resin layer 13 is not flat, and is a rough surface with many projections in different sizes irregularly present thereon, because the resin bleeds from the fiber bundles randomly and irregularly both in the amount and site. It should be noted that in FIG. 2 to FIG. 6, the surface resin layer 13 is not shown for easy understanding.

Figure 3:
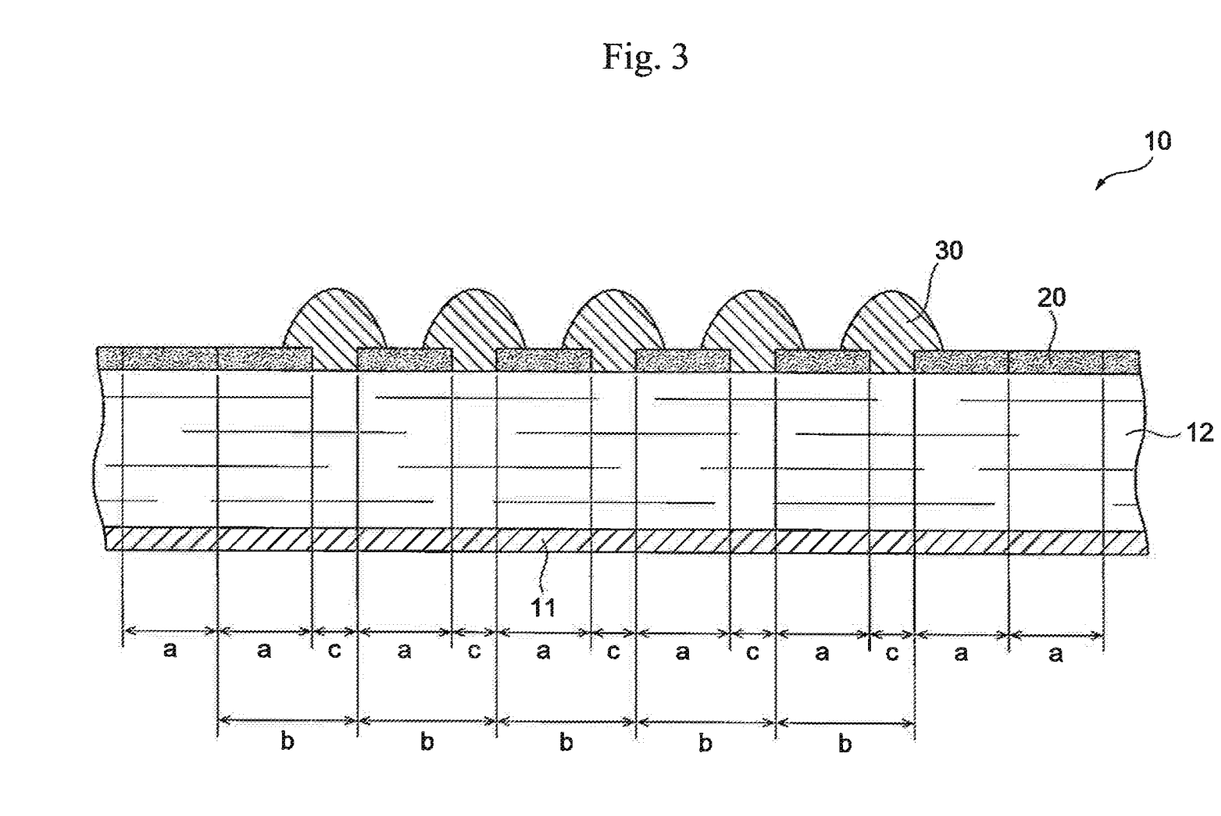
FIG. 3 is a second view for illustration of an operation procedure of the embodiment.

In the high-pressure tank 10 of the aforementioned embodiment, as described above and shown in FIG. 2, the uppermost layer 20 of the fiber reinforced resin layer 12 has a gap with the width c where no fiber bundle is present between adjacent fiber bundles in a portion of the dome portion 18. Therefore, the uncured resin that has impregnated the fiber bundles bleeds more into each of the gaps with the width c that has less resistance as compared to other regions. Then, the bleeding resin projects in a chevron shape from the gaps radially relative to the central axis of the tank so that projections 30 are formed, as shown in FIG. 3. It should be noted that through appropriately adjusting the amount of resin that impregnates the fiber bundles and the width c of the gap, that is, the second pitch width b, the height of each of the projections 30 that are formed through curing of the bleeding resin can be appropriately adjusted. The optimum values may be experimentally determined.

With the aforementioned state, the resin is cured. However, each of the projections 30 made of the cured resin has a round top portion and thus is not suitable for securely bonding the elastic protective member 50 (see FIG. 6) thereto. Therefore, the tip end portion of each of the projections 30 is shaved off by means of an appropriate means with a portion thereof in a predetermined height left unshaved. It should be noted that the elastic protective member 50 may be any member typically used for high-pressure tanks, for example, a foamed resin molded product or a rubber molded product of a synthetic rubber, such as urethane and silicone.

Each of the projections 30 after the tip end portions thereof are shaved off may be in any form, and each of the tip end portions may be shaved off so as to simply obtain a flat surface. It is preferable to shave off each of the tip end portions so as to form a sharpened portion at the tip end of the portion thereof left unshaved. As described above, each of the projections 30 of the bleeding resin is made of a transparent thermosetting resin and has high light transmission. Therefore, it is extremely difficult to perform mechanical processing of shaving off the tip end portions of the projections 30 based on the information obtained through reading the rough shape and positions of projections using laser irradiation.

Therefore, in the present embodiment, a step of applying of a material for forming a light reflecting layer to the region where the fiber bundles are wound in the second pitch width b so as to form a light reflecting layer 40 is further performed. It is preferable, from the viewpoint of operability, to apply the material to the entire region where the fiber bundles are wound in the second pitch width b, but applying the material only to at least the surface portions of the projections 30 can also achieve an intended purpose.

Figure 4:
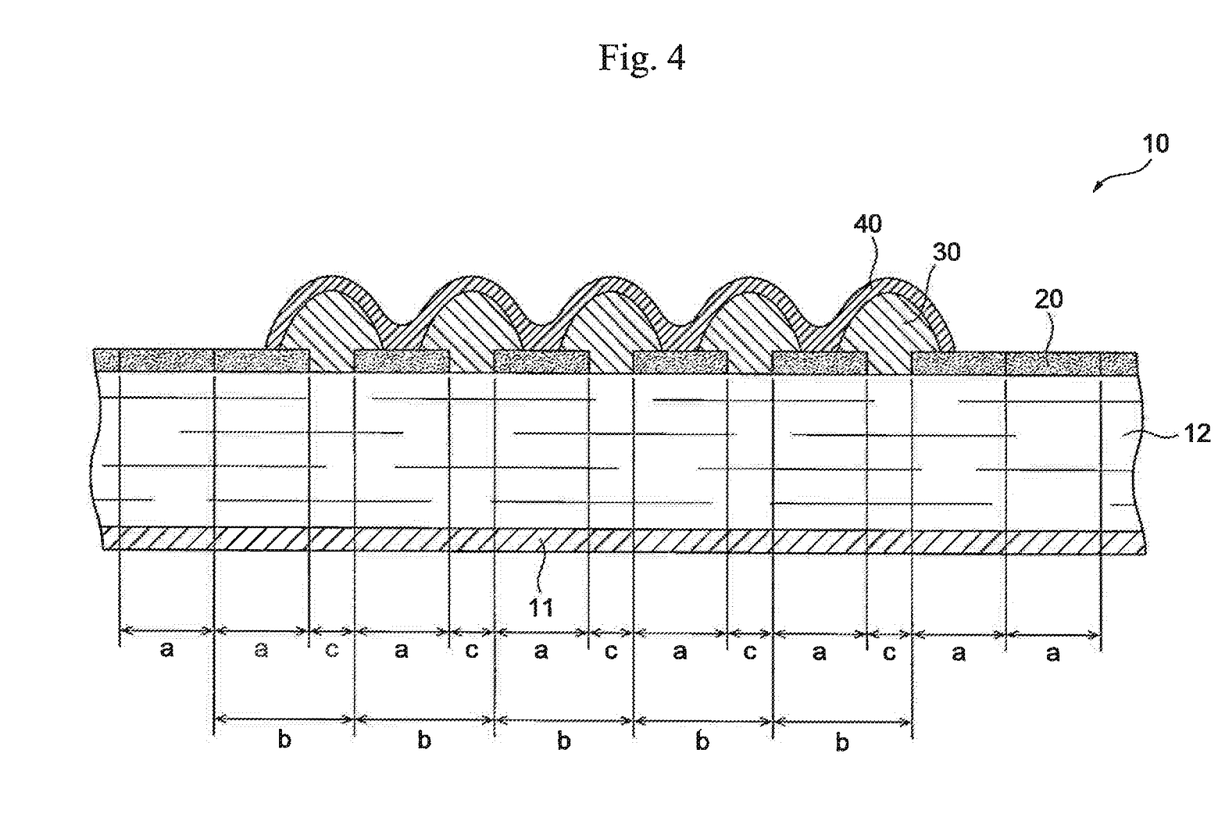
FIG. 4 is a third view for illustration of an operation procedure of the embodiment.

Examples of the "material for forming a light reflecting layer" include materials containing metal powder, of which a titanium oxide is particularly preferred. FIG. 4 shows the state of the light reflecting layer 40 that has been formed through application of the material for forming the light reflecting layer. With the thickness of the light reflecting layer 40 of around 20 μm, for example, an intended purpose can be sufficiently achieved.

With the light reflecting layer 40 formed, the shapes and positions of the projections 30 can be determined using laser, and the top portions of the projections 30 can be mechanically shaved off so as to obtain an appropriate shape based on the obtained information. With the portions left unshaved that are obtained in the aforementioned manner as a base, secure bonding of the elastic protective member 50 is performed. In performing the secure bonding of the protective member 50, after an adhesive is applied to the portions left unshaved and the nearby regions, the protective member 50 with no adhesive layer on the backside thereof is attached thereto. It should be noted that in that case, if the surfaces of the portions left unshaved are flat, the adhesive is easily applied thereto. However, in that case, it is necessary to keep pressing the attached protective member 50 so as not to move until the applied adhesive is cured.

Figure 5:
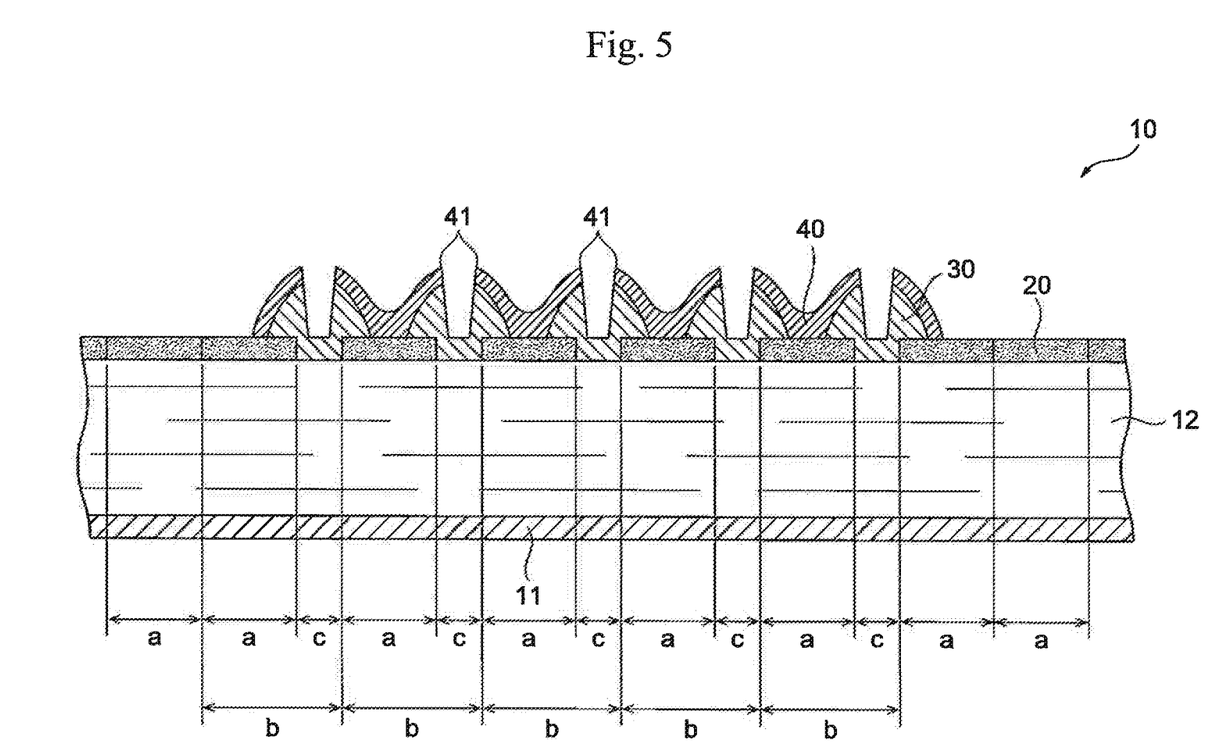
FIG. 5 is a fourth view for illustration of an operation procedure of the embodiment.

FIG. 5 shows an example of the state after the tip end portions are shaved off. Each of the tip end portions is easily shaved off so as to form a sharpened portion 41 at its tip end as shown in FIG. 5 through mechanically shaving it off. It should be noted that in the drawing, the light reflecting layer 40 is shown thick relative to the size of each of the projections 30 for easy understanding, but is actually sufficiently thin. Therefore, the sharpened portion 41 at the tip end includes both the projection 30 made of the cured resin and the light reflecting layer 40 applied thereto, and has a required mechanical strength.

Figure 6:
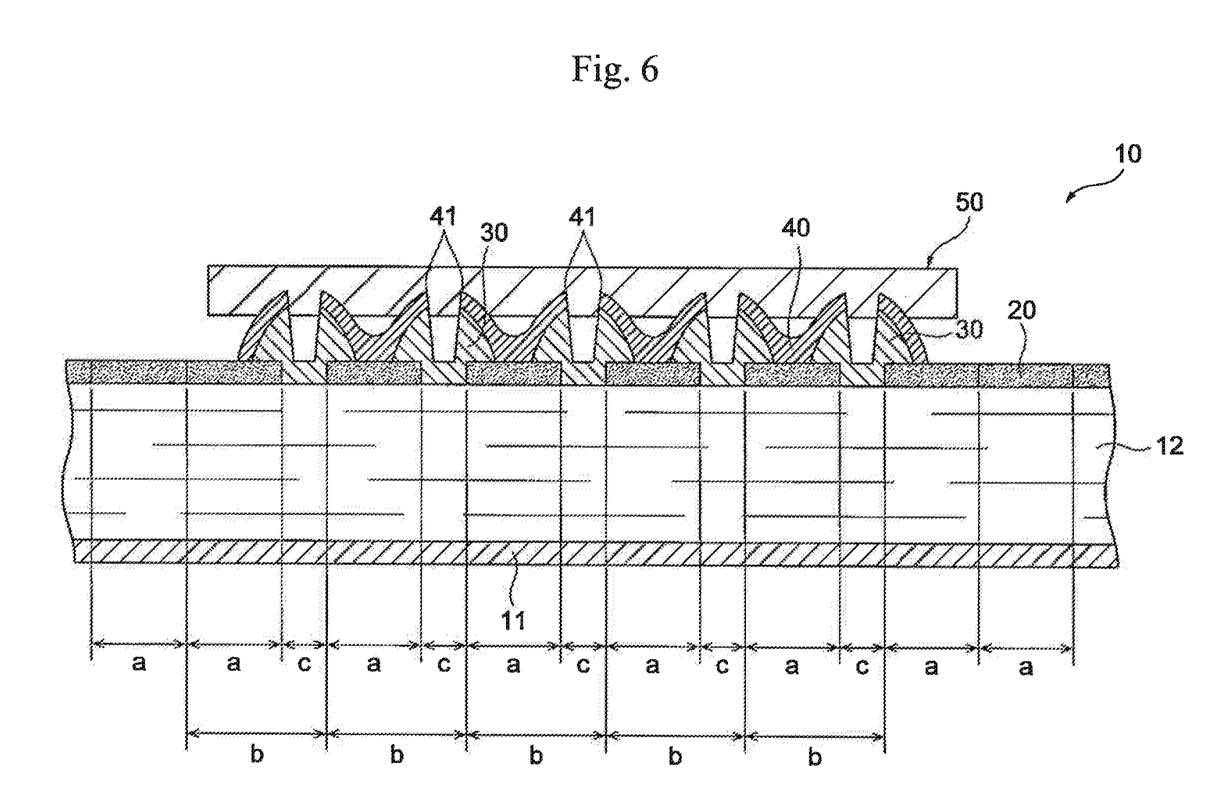
FIG. 6 is a fifth view for illustration of an operation procedure of the embodiment.

In the embodiment shown in FIG. 5, since the tip end of each of the portions left unshaved is the sharpened portion 41, when the protective member 50 is pressed against the portions left unshaved, the sharpened portion 41 can partially or entirely be thrust into the backside of the protective member 50, as shown in FIG. 6, thereby regulating free movements of the protective member 50. Thus, the operation of pressing the protective member 50 until the adhesive solidifies can be omitted. It should be noted that in FIG. 6, for easy understanding, a gap is provided between the backside of the protective member 50 and the upper surface of the uppermost fiber bundle layer 20, but in practice, there is almost no such a gap.

In a more preferred embodiment, a material mixed with an adhesive or a material containing a base material for bonding is used as the material for forming the light reflecting layer 40. Herein, the adhesive is an adhesive or cohesive material, and the base material for bonding is a material that exhibits an adhesive or cohesive property by reaction with the material of the protective member 50.

Examples of the adhesive to be mixed may include materials, such as an epoxy resin, modified silicone, urethane resin, acrylic resin, and cyanoacrylate, of which the epoxy resin is particularly suitable. Examples of the base material for bonding may include materials that promote epoxy curing reaction, such as tertiary amine, although the base material to be used varies depending on the type of the material of the protective member 50. In this manner, with the use of an adhesive or a material containing a base material for bonding as the material for forming the light reflecting layer, it is possible to omit a separate operation of applying the adhesive to the surface of the light reflecting layer 40 and/or the backside of the protective member 50 at the time of secure bonding of the protective member 50, thereby further facilitating and ensuring the secure bonding of the protective member 50.

As described above, according to the present embodiment, it is possible to easily produce in a short operation time the high-pressure tank 10 that has the fiber reinforced resin layer 12 on the outer surface of the liner 11 thereof and also has the protective member 50 securely bonded to a required portion of the outer surface of the fiber reinforced resin layer 12. Further, it is possible to obtain the high-pressure tank 10 in which the protective member 50 is stably and securely bonded to the region where the fiber bundles are wound in the second pitch width b.

In another embodiment, in addition to the aforementioned processing, the processing described in JP 2011-144860 A may be further performed that includes a step of applying a solvent to the uncured surface resin layer 13, which has been formed through bleeding of an uncured resin component of the uncured fiber reinforced resin layer to the outside, to allow the solvent to infiltrate the uncured surface resin layer 13, and a step of performing heating treatment for foaming the surface resin layer 13 to make it porous through removal of the solvent by evaporation as well as curing the resin component of the uncured fiber reinforced resin layer. A method for producing a tank with a protective member that further includes the aforementioned method and a tank with a protective member produced using the method are also encompassed by the present disclosure.

In that case, it is preferable to use as the solvent a solvent that is highly compatible with an uncured resin and that has a lower boiling point than the heating temperature at the time of performing thermal curing. When an epoxy resin is used as the resin for forming the fiber reinforced resin layer 12 (surface foamed resin layer 13), methyl ethyl ketone (MEK), toluene, dimethylacetamide, acetone, and the like may be used, and in particular, it is preferable to use MEK. Further, the compatibility and evaporation temperature may be adjusted through mixing of two or more solvents.

DESCRIPTION OF SYMBOLS

10 High-pressure tank
11 Liner
12 Fiber reinforced resin layer
18 Dome portion
20 Uppermost layer of fiber reinforced resin layer
30 Projection of cured resin
40 Light reflecting layer made of material for forming light reflecting layer
41 Sharpened portion of tip end of portion left unshaved
50 Securely bonded protective member
a First winding pitch of fiber bundles
b Second winding pitch of fiber bundles
c Difference between second winding pitch width and first winding pitch width (gap between fiber bundles)

What is claimed is:

1. A tank with an elastic protective member, including a fiber reinforced resin layer formed through winding fiber bundles containing an uncured resin component in multiple layers around an outer surface of a liner,
wherein:
at least an outermost layer of the fiber reinforced resin layer has one or more regions where a gap with a required width where no fiber bundle is present between the fiber bundles is formed,
a resin that has cured after bleeding from the fiber bundles is present in the gap,
a tip end portion of the resin cured is a sharpened portion, and
the elastic protective member is securely bonded to the sharpened portion such that the sharpened portion penetrates a backside of the elastic protective member.

2. The tank with the protective member according to claim 1, wherein the one or more regions where the gap is formed is/are positioned in at least a dome portion of the tank.

* * * * *